United States Patent [19]

Hoffmann et al.

[11] Patent Number: 5,225,103
[45] Date of Patent: Jul. 6, 1993

[54] AQUEOUS ALDEHYDE SOLUTIONS FOR TRAPPING HYDROGEN SULFIDE IN NATURAL GAS AND CRUDE OIL PRODUCING PLANTS

[75] Inventors: Hermann Hoffmann, Kelkheim(Taunus), Fed. Rep. of Germany; Frederic Mabire, Arcueil, France

[73] Assignee: Hoechst Aktiengesellschaft, Frankfurt am Main, Fed. Rep. of Germany

[21] Appl. No.: 909,635

[22] Filed: Jul. 7, 1992

Related U.S. Application Data

[62] Division of Ser. No. 571,169, Aug. 21, 1990, Pat. No. 5,152,916.

[30] Foreign Application Priority Data

Aug. 23, 1989 [DE] Fed. Rep. of Germany ....... 3927763

[51] Int. Cl.$^5$ .............................................. C23F 11/14
[52] U.S. Cl. .................... 252/189; 252/8.555; 252/387; 252/390; 252/392; 422/16; 423/226
[58] Field of Search ............ 252/8.555, 387, 390, 252/392, 189; 422/16; 423/226

[56] References Cited

U.S. PATENT DOCUMENTS

| | | | |
|---|---|---|---|
| 1,991,765 | 2/1935 | Marks | 568/75 |
| 2,606,873 | 8/1952 | Cardwell et al. | 422/12 |
| 3,121,091 | 2/1964 | Green | 29/27 B |
| 3,514,410 | 3/1970 | Engle et al. | 252/87 |
| 3,585,069 | 6/1971 | Owsley | 252/8.555 |
| 3,654,993 | 4/1972 | Smith et al. | 252/395 |
| 3,669,613 | 6/1972 | Knox et al. | 422/12 |
| 4,220,500 | 9/1980 | Baba et al. | 162/127 |
| 4,238,350 | 12/1980 | Larsen et al. | 252/392 |
| 4,289,639 | 9/1981 | Buske | 252/87 |
| 4,310,435 | 1/1982 | Frenier | 252/180 |
| 4,680,127 | 7/1987 | Edmondson | 210/749 |
| 4,730,079 | 3/1988 | Hofinger et al. | 252/8.555 |
| 4,964,468 | 10/1990 | Adams et al. | 252/8.555 |
| 4,997,912 | 5/1991 | Whirtz et al. | 252/352 |
| 5,058,678 | 10/1991 | Dill et al. | 252/8.552 |
| 5,082,576 | 1/1992 | Howson | 252/8.552 |

*Primary Examiner*—Robert L. Stoll
*Assistant Examiner*—Valerie Fee
*Attorney, Agent, or Firm*—Connolly and Hutz

[57] ABSTRACT

Aqueous aldehyde solutions for trapping hydrogen sulfide comprising 5 to 50% by weight of an aldehyde and 1 to 5% by weight, relative to the aldehyde solution of a formulation comprising a) 10 to 80% by weight of a long-chain quaternary ammonium compound and 20 to 90% by weight of water or of a $C_1$-$C_4$-alcohol, b) 10 to 80% by weight of a condensation product of a $C_{12}$-$C_{18}$-fatty acid with a polyethylene polyamine of the formula $$NH_2-(C_2H_4-NH)_x-C_2H_4-NH_2$$

in which x is 1, 2 or 3 and the molar ratio of fatty acid to basic nitrogen in the polyethylene polyamine is 3:1 to 3:2, and 20 to 90% by weight of water or of a $C_1$-$C_4$-alcohol, or c) 50 to 95% by weight of the fatty acid-polyethylene polyamine condensation product as defined in c) and 5 to 50% by weight of a nonionic or anionic surfactant.

2 Claims, No Drawings

AQUEOUS ALDEHYDE SOLUTIONS FOR TRAPPING HYDROGEN SULFIDE IN NATURAL GAS AND CRUDE OIL PRODUCING PLANTS

This application is a divisional of application Ser. No. 07/571,169, filed Aug. 21, 1990, now U.S. Pat. No. 5,152,916.

DESCRIPTION

The presence of hydrogen sulfide in crude natural gas or crude oil gas and also in the accompanying aqueous or hydrocarbon phases is in general highly undesirable. Hydrogen sulfide is highly toxic and leads to hydrogen-induced embrittlement in conventionally used carbon steels and to stress-corrosion cracking in more highly alloyed materials. For these reasons, the attempt has been made to remove the hydrogen sulfide from such systems by washing or modifying chemically, using all possible means.

Accordingly, various physical and also chemical processes for the purification of crude gases exist, which, depending on the content of hydrogen sulfide and accompanying substances in the crude gas and the demands on the purity of the final product, have economic advantages and disadvantages to a varying degree, it naturally only being reasonable to apply the chemical processes if the hydrogen sulfide contents are low. This is the case, for example, with natural gas or oil gas having low hydrogen sulfide contents.

A widespread requirement of the purity of natural gas for consumer networks is a hydrogen sulfide content of 6 mg/Nm$^3$. Several processes can be used to fulfil this requirement. However, on crude oil platforms in the open sea, not all processes are possible for reasons of weight. In some cases, the occurrence of hydrogen sulfide when operating a rig platform was not at all observed until some time later. The later installation of, for example, washing units based on an aqueous alkanolamine solution is then no longer possible for reasons of weight. In these cases, the only remaining method is the use of hydrogen sulfide trapping agents, in which case the reaction mainly takes place in the aqueous phase, even though the injection into the three-phase mixture crude oil/deposit water/gas phase, which is present at the top of a producing well, is preferred.

The use of aldehydes for trapping hydrogen sulfide has been known for a long time. Thus, U.S. Pat. No. 1,991,765 describes the reaction of hydrogen sulfide with an aldehyde between pH values of 2-12 at temperatures of 20°-100° C. The reaction of formaldehyde, glyoxal, acrolein and other aldehydes in connection with the dissolution of impurities containing iron sulfide by an acid treatment especially at pH values of 2 or lower is described repeatedly (e.g. U.S. Pat. Nos. 2,606,873, 3,514,410, 3,585,069, 3,669,613, 4,220,500, 4,289,639, 4,310,435 and 4,680,127).

Of all these aldehydes, in particular glyoxal has found its way into the crude oil and natural gas industry as a hydrogen sulfide trapping agent, since a water-soluble reaction product is formed with glyoxal, while in the case of formaldehyde trithiane is formed as a cyclic condensation product of poor water solubility. For this reason, glyoxal has an advantage compared with formaldehyde for technical reasons, but compared with other commercial dialdehydes, such as, in particular, glutaraldehyde, for economic reasons.

An important requirement when using hydrogen sulfide trapping agents is that the products must not increase the corrosion of the crude oil or natural gas producing plants. It has now been found that the corrosion rate of steel in contact with aqueous aldehyde solutions can be decreased by adding a long-chain quaternary ammonium salt, a fatty acid/polyethylene polyamine condensation product or a mixture of this condensation product with a nonionic or anionic surfactant to the aldehyde solution. Accordingly, the invention relates to an aqueous aldehyde solution for trapping hydrogen sulfide, containing 5 to 50% by weight of an aldehyde and additionally 1 to 5% by weight, relative to the aldehyde solution, of a formulation comprising a) 10 to 80% by weight of a quaternary ammonium compound of the formula

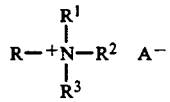

in which
R is $C_8$–$C_{22}$-alkyl or $C_8$–$C_{22}$-alkenyl,
R$^1$ is $C_1$–$C_{22}$-alkyl or $C_8$–$C_{22}$-alkenyl,
R$^2$ is $C_1$–$C_4$-alkyl or benzyl,
R$^3$ is $C_1$–$C_4$-alkyl and
A is chloride, bromide or methosulfate,
and 20 to 90% by weight of water or of a $C_1$–$C_4$-alcohol, b) 10 to 80% by weight of an ester of oxalkylated alkylalkylenediamines, which may be quaternized and is obtained by esterification of oxalkylated alkylalkylenediamines of the formula

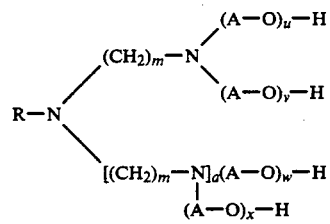

in which R is $C_8$–$C_{24}$-alkyl or $C_8$–$C_{24}$-alkenyl, A is a group of the formula —$C_2H_4$— or —$C_3H_6$—, a is 0 or 1, m is 2 or 3, u, v, w and x are numbers whose sum is 3 to 30, preferably 10 to 30, in the case where a is 0, and 4 to 40, preferably 20 to 40, in the case where a is 1, with acids of the formula

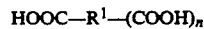

in which n is 0 or 1 and R$^1$ is alkyl, alkenyl, cycloalkyl or cycloalkenyl of 5 to 35 carbon atoms each, in the case where n is 0, or is the radical of a dimeric fatty acid, in the case where n is 1, and, if appropriate, subsequent quaternization with the formation of groupings of the formula

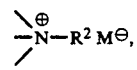

in which $R^2$ is $C_1$–$C_4$-alkyl or benzyl and $M^{\ominus}$ is a halide or methosulfate anion, and 20 to 90% by weight of water or of a $C_1$–$C_4$-alcohol, c) 10 to 80% by weight of a condensation product of a $C_{12}$–$C_{18}$-fatty acid with a polyethylene polyamine of the formula $$NH_2\text{—}(C_2H_4\text{—}NH)_x\text{—}C_2H_4\text{—}NH_2$$

in which x is 1, 2 or 3 and the molar ratio of fatty acid to basic nitrogen in the polyethylene polyamine is 3:1 to 3:2, and 20 to 90% by weight of water or of a $C_1$–$C_4$-alcohol, or d) 50 to 95% by weight of the fatty acid-polyethylene polyamine condensation product as defined in c) and 5 to 50% by weight of a nonionic or anionic surfactant.

Suitable aldehydes for the aqueous solutions according to the invention are preferably all readily accessible water-soluble aldehydes, such as, for example, formaldehyde, glyoxal, glutaraldehyde, acrolein or mixtures of these aldehydes. In particular glyoxal is preferred. The formulation described above of a quaternary ammonium compound, a condensation product of a fatty acid with a polyethylene polyamine or a mixture of this condensation product with a surfactant is added to the aqueous solution of these aldehydes.

The products used in formulations a), b) and c) are sufficiently known and available as commercial products. The products under b) are obtained, for example, by reaction of triethylenetetramine or tetraethylenepentamine with fatty acids, such as oleic acid, tall oil fatty acid, soya oil fatty acid or lauric acid. Suitable fatty acids are here also naphthenic acids of a molecular weight of 250–350. Suitable nonionic surfactants in formulation c) are oxethylated fatty alcohols or oxethylated alkylphenols containing 4 to 30 ethylene oxide units each. Examples of suitable anionic surfactants are fatty acid salts, alkane sulfonates, alkyl sulfates, alkylbenzenesulfonates or fatty acid esters of coconut alkyl- or tallow fatty alkylpropylenediamine polyglycol ethers.

The solution according to the invention is added in crude oil production at the top of the well. The amount added depends on the $H_2S$ content. The aldehyde solution is usually metered in in such an amount that four moles of aldehyde are used per mole of $H_2S$.

EXAMPLES

The model system for determining the corrosion rate was an oil-field water from the North Sea having the following composition: $Na^+$ 9,000 mg/l, $K^+$ 200 mg/l, $Ca^{++}$ 250 mg/l, Ba 60 mg/l, $Sr^{++}$ 25 mg/l, $Cl^-$ 14,300 mg/l, $HCO_3^-$ 1,050 mg/l. This water was carefully freed of traces of oxygen by passing pure nitrogen through it for one hour and was brought to a specific $H_2S$ concentration by introducing gaseous hydrogen sulfide for a short period. In a separate storage vessel, petroleum was likewise made oxygen-free by passing pure nitrogen through it. The corrosion test was performed on sheet metal strips made of structural steel DIN 1.1203 having the dimensions 75×10×1 mm. The coupons were carefully freed of the oxide film in the usual manner, using abrasives, rinsed with water and acetone, dried and weighed to the nearest 0.1 mg.

The coupons were placed in 100 ml screw-cap bottles, covered with 90 ml of the hydrogen sulfide-containing oil-field water described above and with a layer of 10 ml of petroleum, sealed under a stream of nitrogen and rotated in a test washing machine at 70° C. and 30 rpm for 24 hours. The weight loss per coupon in mg can be taken as the measure for the corrosion rate. Under the conditions chosen, 1 mg of weight loss corresponds to 1.2 mpy (mils, one thousandths of an inch per year). A corrosion rate of 1 mm/a would correspond to a surface removal of 481 mg. The figures listed in Table 1 represent mean values of measuring points having a maximum variance of ±5%.

EXAMPLE 1

In an oil-field water of the composition mentioned, which was first saturated with $CO_2$ and to which 200 ppm of hydrogen sulfide and 2,000 ppm of 40% aqueous glyoxal solution had then been added, a surface removal of 20.5 mg was observed by the method described above. Tests carried out in parallel, in which 30 and 100 ppm of the compounds mentioned in each case were added gave the following surface removals in mg at 24 h/70° C. in the system water/petroleum 9:1 on C steel coupons of 75×10×1 mm:

|  | 30 ppm | 100 ppm |
|---|---|---|
| (a) Coconut alkylbenzyldimethyl-ammonium chloride (50% in water) | 0.9 | 0.4 |
| (b) Condensation product of 3.3 moles of tallow oil fatty acid with 1 mole of tetraethylenepentamine (45% in isobutanol) | 3.7 | 2.8 |
| (c) Tallow fatty propylenediamine polyglycol ether (25 moles of ethylene oxide) esterified with naphthenic acid (50% in butylglycol) | 20.7 | 6.1 |
| (d) Mixture of 38% of a condensation product of 1 mole of naphthenic acid with 1 mole of diethylenetriamine, 12% of tributylphenol poly(50)glycol ether, balance methanol and water. | 2.9 | 0.7 |

Products a)–d) are commercial products. The reductions of the corrosion rate obtained are in some cases substantial, some products showing this effect even at low concentrations used.

EXAMPLE 2

Analogously to Example 1, tests were carried out, varying the ratio of glyoxal (40%)/$H_2S$. The surface removals in mg without additive are listed for comparison. The $H_2S$ content was uniformly 300 ppm.

|  | 300 | 900 | 1,500 | 3,000 |
|---|---|---|---|---|
|  |  | ppm of glyoxal (40%) | | |
| Without additive | 11.1 | 16.5 | 17.2 | 43.9 |
| With 50 ppm of additive (a) according to Example 1 | 11.0 | 15.4 | 0.8 | 0.4 |

This example shows that the inhibition of corrosion only sets in at higher glyoxal/$H_2S$ ratios. On the other hand, glyoxal (40%)/$H_2S$ ratios of greater than 10:1 are necessary to achieve the desired effect of the reaction of the aldehyde with hydrogen sulfide.

EXAMPLE 3

In a 5% common salt solution containing 2,000 ppm of glyoxal (40%) and 200 ppm of $H_2S$, a surface removal of 25.5 mg was measured after 24 hours by the test procedure described. The corresponding surface removals after 24 hours with the addition of the following quaternary ammonium compounds are given below:

| | | |
|---|---|---|
| (a) n-Dodecylbenzyldimethylammonium chloride | 10 ppm | 18.0 |
| | 20 ppm | 4.5 |
| (b) n-Octadecylbenzyldimethylammonium chloride | 15 ppm | 1.7 |
| (c) n-Dodecyltrimethylammonium sulfate | 15 ppm | 20.5 |
| | 50 ppm | 5.5 |
| (d) n-Octadecyltrimethylammonium sulfate | 15 ppm | 3.0 |
| | 50 ppm | 1.6 |
| (e) Soya alkyltrimethylammonium chloride | 15 ppm | 1.0 |

The function of the hydrogen sulfide trapping agent must not be impaired by the presence of the additives. As a control, the reduction rate of hydrogen sulfide was measured not only in an aqueous solution but also in a petroleum solution, the measurements being carried out not only in the presence but also in the absence of an additive. Uniformly, 200 mg/l of hydrogen sulfide were introduced into the phases in each case and treated with a 10-fold amount of a 40% glyoxal solution. The reduction in percent of the $H_2S$ content as a result of the reaction with glyoxal was monitored by a potentiometric method.

In the case of the petroleum phase, the glyoxal solution was metered in, and the mixture was constantly stirred by means of a magnetic stirrer. At different intervals, aliquots were removed and analyzed for $H_2S$. The results are listed in the table below. Compound a) from Example 1 was used as the additive in a concentration of 90 ppm.

A reading of the figures shows that the presence of the additive does not lead to a significant reduction of the reaction rate but, even in the case of the reaction in the hydrocarbon phase, to a substantial acceleration of the reaction rate.

Reduction in percent of the hydrogen sulfide content after reaction with glyoxal

| | Water phase | | Petroleum phase | |
|---|---|---|---|---|
| | without | with | without | with |
| 1 min. | 50 | 45 | 0 | 20 |
| 5 min. | 60 | 56 | 18 | 58 |
| 15 min. | 70 | 64 | 40 | 94 |
| 30 min. | 73 | 73 | 64 | 96 |

We claim:
1. An aqueous aldehyde solution for trapping hydrogen sulfide comprising 5 to 50% by weight of an aldehyde and 1 to 5% by weight, relative to the aldehyde solution of a formulation comprising
   a) 10 to 80% by weight of a quaternary ammonium compound of the formula

$$R-\overset{R^1}{\underset{R^3}{\overset{|}{\underset{|}{N}}}}-R^2 \quad A^-$$

in which
R is $C_8$–$C_{22}$-alkyl or $C_8$–$C_{22}$-alkenyl,
$R^1$ is $C_1$–$C_{22}$-alkyl or $C_8$–$C_{22}$-alkenyl,
$R^2$ is $C_1$–$C_4$-alkyl or benzyl
$R^3$ is $C_1$–$C_4$-alkyl and
A is chloride, bromide or methosulfate,
and 20 to 90% by weight of water or of a $C_1$–$C_4$-alcohol,
   b) 10 to 80% by weight of a condensation production of a $C_{12}$–$C_{18}$-fatty acid with a polyethylene polyamine of the formula $$NH_2-(C_2H_4-NH)_x-C_2H_4-NH_2$$

in which x is 1, 2 or 3 and the molar ratio of fatty acid to nitrogen in the polyethylene polyamine is 3:1 to 3:2, and 20 to 90% by weight of water or of a $C_1$–$C_4$-alcohol, or
   c) 50 to 95% by weight of the fatty acid-polyethylene polyamine condensation product as defined in b) and 5 to 50% by weight of a nonionic or anionic surfactant.
2. A method for trapping hydrogen sulfide in natural gas and crude oil producing plants with simultaneous reduction of corrosion rate comprising introducing in said plant the aqueous aldehyde solution of claim 1.

* * * * *